Sept. 29, 1959           H. C. KENDALL           2,907,022

SPEED MEASURING APPARATUS

Filed Feb. 20, 1957           4 Sheets-Sheet 1

FIG. 1.

INVENTOR.
H.C. KENDALL
BY
HIS ATTORNEY

Sept. 29, 1959  H. C. KENDALL  2,907,022
SPEED MEASURING APPARATUS
Filed Feb. 20, 1957  4 Sheets-Sheet 2

FIG. 2A.

INVENTOR.
H.C. KENDALL
BY
Forest B. Hitchcock
HIS ATTORNEY

Sept. 29, 1959  H. C. KENDALL  2,907,022
SPEED MEASURING APPARATUS
Filed Feb. 20, 1957  4 Sheets-Sheet 3

FIG. 2B

INVENTOR.
H.C. KENDALL
BY
Forest B. Hitchock
HIS ATTORNEY

2,907,022

Patented Sept. 29, 1959

2,907,022

SPEED MEASURING APPARATUS

Hugh C. Kendall, Rochester, N.Y., assignor to General Railway Signal Company, Rochester, N.Y.

Application February 20, 1957, Serial No. 641,312

6 Claims. (Cl. 343—8)

This invention relates to speed measuring apparatus and more particularly pertains to a circuit organization which improves the accuracy of speed measurement obtainable from such apparatus.

Speed measuring apparatus of the continuous wave radar type has been found to be particularly useful in determining the speeds of railway cars passing through a car classification yard. Accurate speed information is necessary to measure car performance in advance of the group retarders. With car rolling ability accurately measured, the release speed from the group retarder that will enable the car to couple onto others in its preselected classification track with the proper speed may be accurately predicted. Speed measuring apparatus also continuously monitors the speed of a car as it passes through the retarder and causes the release of the retarder when the speed has been reduced to the desired value.

Described briefly, a continuous wave radar speed measuring system utilizes the well-known Doppler principle by transmitting a directional beam of high frequency radio energy towards a moving vehicle. A portion of the signal is reflected from the vehicle with a shift in frequency that is proportional to the vehicle's velocity with respect to the point of origin of the signal. The reflected signal with its shifted frequency is mixed with a portion of the originally generated signal to obtain a beat frequency which is directly proportional to vehicle speed. The beat frequency signal can then be caused, through the medium of an integrating circuit for example, to provide an output quantity such as a voltage whose amplitude is proportional to the beat frequency thereby making it possible to selectively control an analog computing circuit in accordance with the speed of the vehicle.

It has been found that the reflected signal is often of an erratic nature with the result that the beat frequency signal may contain extra pulses, or be missing pulses, or be subject to shifts in phase. More specifically, the originally generated signal beamed towards the vehicle may be irregular so that nulls in the antenna pattern exit. When a vehicle passes through such a null location, there is a momentary loss of signal so that no beat frequency is produced for a time. Alternatively, spurious signals may be produced at a higher frequency. This has been found to occur as a result of the motion of the shoe beams of the car retarder as they operate to vary the braking pressure on a car. The signal is particularly erratic under those conditions where the directional antenna is located between the track rails and a vehicle is passing directly over the antenna. Thus, the principal reflecting point may at first be the front of the car while it is still at some distance from the antenna. Later, the principal reflecting point may be the axles and then later the wheels of the car. Further disturbances occur when the principal reflecting point shifts from the front axles and wheels to the rear axles and wheels. The overall result is that, although the primary frequency content of the signal is still proportional to the speed of the car, the erratic nature of the signal which occurs momentarily results in a highly irregular beat frequency signal.

One solution to this problem which has been attempted is to increase the time constant of the integrating circuit. An increase of the time constant means that any short lived disturbances in the beat frequency signal can have but little effect on the speed measurement. On the other hand, the long time constant is unfavorable in that it makes it impossible for the output signal to immediately follow, and thus accurately represent at all times the instantaneous car speed.

In view of these various limitations, the circuit organization of this invention has been provided to enable an accurate determination of vehicle speed to be made at all times so that spurious and erratic signals will have but little effect on the output. This is done according to the present invention without requiring any long time constant integrating circuit with the result that the representation of car speed by the output signal is at all times up-to-date and capable of following changes in car speed almost immediately upon their occurrence.

Described in a general manner, the apparatus of this invention responds to discrete electrical pulses occurring at the rate of the beat frequency signal and repeatedly provides a direct-current voltage whose amplitude is proportional to the interval between each successive pair of pulses. In other words, for each output pulse in the beat frequency signal, there is generated a direct-current voltage proportional to the interval that elapsed between that pulse and the immediately preceding pulse. Each such generated voltage may then be considered to represent the period of the beat frequency signal, and, of course, this voltage is of the same level repeatedly as long as the beat frequency signal is of a constant frequency. The organization also includes storage means for storing this voltage. In addition, there is a voltage comparison circuit which is effective each time that such a voltage proportional to the period is generated to compare the level of such voltage with the voltage already stored in the storage circuit. If the newly generated voltage is of such an amplitude that it falls within prescribed limits of the voltage then being stored, the newly generated voltage is impressed upon the storage circuit, and the voltage stored therein is changed accordingly so that it equals the level of such newly generated voltage. This means that the stored voltage which is proportional to pulse period can be changed from one succeeding beat frequency pulse to the next only by an amount which would indicate that the received pulse represents a bona fide signal and not some spurious or false signal.

Thus, the stored voltage represents at each instant the period of the beat frequency signal. The magnitude of this stored voltage is then used to govern the frequency of operation of a local oscillator. This local oscillator thus generates electrical pulses with a frequency corresponding to the true beat frequency signal, since the stored voltage is not affected by measured pulse periods differing appreciably from the norm.

It is, accordingly, an object of this invention to provide a continuous wave radar speed measuring organization which is substantially unaffected by disturbances in the beat frequency output signal.

Another object of this invention is to provide speed measuring apparatus of the radio frequency Doppler type wherein variations of the beat frequency signal are accepted as providing speed information only provided that such variations are within acceptable predetermined limits.

Other objects, purposes and characteristic features of this invention will in part be obvious from the accompanying drawings and in part be pointed out as the description of the invention progresses.

In describing this invention in detail, reference will be made to the accompanying drawings disclosing one embodiment of this invention and in which.

To aid in the description of this invention, the various parts and circuits are shown diagrammatically. The symbols (B+) and (B−) represent the positive and negative terminals, respectively, of a source of voltage having an intermediate tap designated by the ground symbol, thereby providing a suitable voltage source for the operation of various electron tubes. It is assumed that all the tubes shown are provided with heaters for indirect heating of the tube cathodes.

General organization

Described in a general manner, the present invention contemplates, in part, the use of apparatus for the generation of a high frequency signal which is beamed by means of a directional antenna towards a moving vehicle. A portion of this signal is reflected and intercepted and then mixed with a portion of the originally generated frequency to provide a beat frequency signal. Circuit means is also provided which responds to the beat frequency signal by providing discrete electrical output pulses.

The apparatus of the present invention is organized to respond to the discrete electrical pulses by restoring a saw-tooth wave to its lowest level. From this lowest level it then rises in an approximately linear fashion until it is again returned to the low level by the next input pulse. Each input pulse is also effective, just prior to the time that it restores the saw-tooth oscillator to its lower level, to sample the then existing voltage amplitude of the saw-tooth wave. It compares this voltage amplitude with the amplitude of voltage similarly produced in response to the preceding pulse and now being temporarily stored in a storage circuit.

If the sampled voltage falls within predetermined limits of the already stored voltage, this voltage is then itself impressed upon the storage capacitor. Thus, only if the measured period changes by a reasonable amount from one pulse to the next can such change be effective to change the stored voltage.

The storage circuit thus continuously stores a voltage whose level is proportional to the period of the input pulses. If the input signal becomes momentarily erratic, the saw-tooth oscillator is restored to its lower voltage level by each input pulse at a time when its voltage ordinarily will not fall within the prescribed limits of the voltage then stored in the storage capacitor. Under these circumstances, the peak amplitude of the sawtooth cannot be impressed upon the storage circuit so that it may be considered that the circuit organization ignores this erratic information and the storage capacitor continues to store the period of the last bona fide input signal. The input signal is ignored until such time that the disturbance has ceased so that the period of the input signal will again match the period that is, in effect, stored in the storage capacitor.

The apparatus of this invention also includes another saw-tooth oscillator, independent of the first, whose frequency of operation is governed by the voltage stored in the storage circuit. This saw-tooth oscillator ordinarily operates at the same frequency as the first saw-tooth oscillator when there are no disturbances in the output signal. Moreover, it continues to operate undisturbed at such frequency at a time when the first saw-tooth oscillator is behaving erratically in response to an erratic input signal. It does this because the stored voltage is not affected by such an erratic signal. The output voltage of the second saw-tooth oscillator is effective to generate pulses which are applied to a discriminator circuit that establishes control of output circuits in accordance with vehicle speed.

Although the speed measuring apparatus of this invention is highly useful wherever it is desired to measure vehicle speeds, it is here disclosed particularly as used in a railway car classification yard. A system which automatically controls the car retarders in such a yard and uses radio frequency speed measuring apparatus effective to give a continuous measure of vehicle speed is disclosed in the pending application of N. C. L. Brown, Ser. No. 359,052, filed June 2, 1953; H. C. Kendall et al., Ser. No. 359,162, filed June 2, 1953; N. B. Coley et al., Ser. No. 383,432, filed October 1, 1953; N. C. L. Brown, Ser. No. 428,012, filed May 6, 1954; and H. C. Kendall et al., Ser. No. 513,364, filed June 6, 1955.

Figure 1:
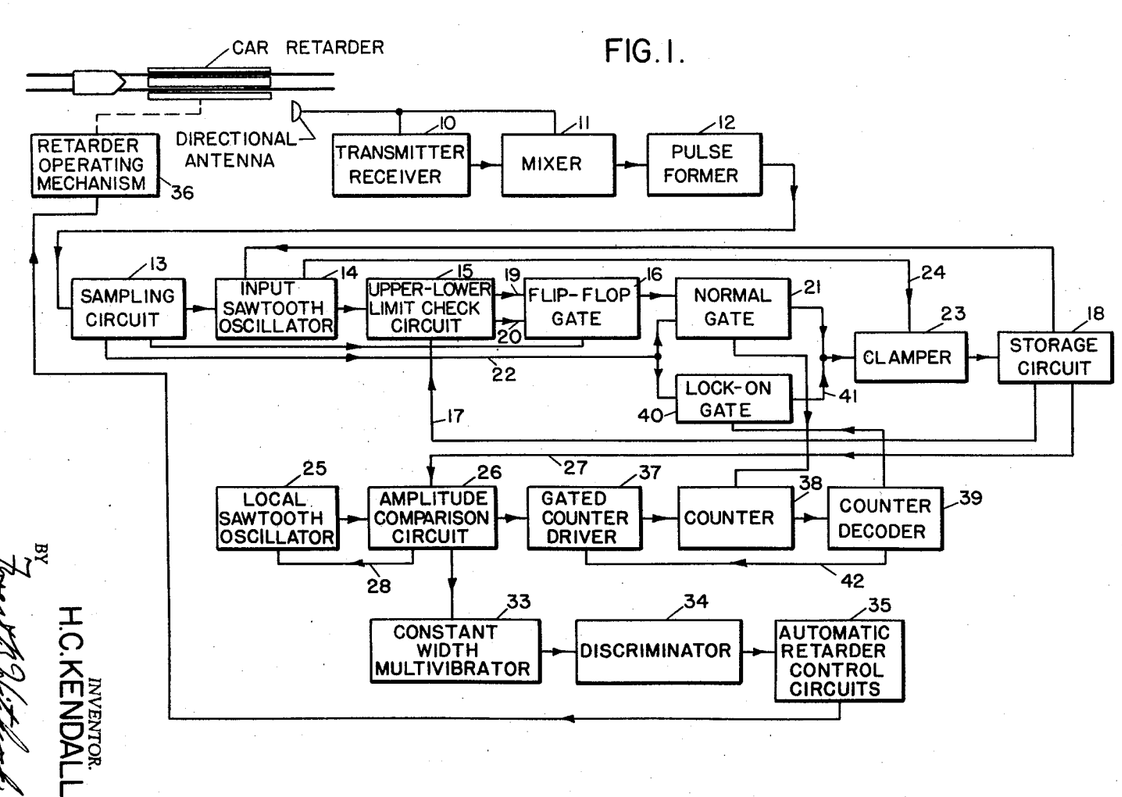
Fig. 1 is a block diagram illustrating the general organization of the present invention.

Description of block diagram—Fig. 1

Referring to the block diagram of Fig. 1, a car retarder is shown diagrammatically, and adjacent the exit end thereof is a directional antenna. This antenna receives a high frequency signal from the transmitter-receiver 10. A portion of the signal reflected from an approaching vehicle and intercepted by the directional antenna is supplied to the transmitter-receiver. It is mixed with a portion of the generated signal in the mixer 11 which, through rectifying and filtering action is then able to supply a beat frequency signal to the pulse former 12 that is proportional to vehicle speed.

The output of the pulse former 12 constitutes discrete electrical pulses (see Fig. 3, line A) which are fed to the sampling circuit 13. Each pulse acts upon the sampling circuit 13 on its trailing edge in such a way that the input saw-tooth oscillator 14 is triggered to start a new saw-tooth wave. Immediately prior to the abrupt return of the saw-tooth wave, however, the peak amplitude of the sawtooth is sampled by comparing it with the voltage then being stored in the storage circuit 18. This comparison is accomplished by the upper-lower limit check circuit 15 of Fig. 1 which is shown as receiving one input from the oscillator 14 and another input over lead 17 from the storage circuit 18.

As the saw-tooth voltage rises, it first passes the level of the lower limit which is a predetermined amount below the then stored voltage as shown at line B of Fig. 3. When this happens the flip-flop gate 16 is opened by an input pulse it receives over lead 19. However, if the saw-tooth voltage is allowed to rise above the upper limit, as it will if not restored in sufficient time by another input pulse, the voltage of the saw-tooth wave will exceed the upper limit, thereby closing the flip-flop gate 16 by the input applied to it over lead 20.

The normal gate 21 receives a conditioning input from the flip-flop gate only while the flip-flop gate is open. This normal gate 21 also receives an input pulse from the sampling circuit 13 over lead 22 upon each occurrence of a beat frequency pulse. If this pulse is applied to the normal gate 21 during the interval that the normal gate receives its conditioning input from the flip-flop gate 16, the normal gate 21 will be triggered and will provide an output pulse to the clamper 23.

In other words, the sampling circuit 13 which responds to each beat frequency pulse to restore the saw-tooth oscillator voltage to its low level is also effective immediately prior to this to supply a trigger pulse to the normal gate 21. If the amplitude of the saw-tooth wave just prior to its return is within predetermined limits of the voltage then stored in the storage circuit 18, the normal gate will also receive an enabling bias from the then open flip-flop gate 16 so that an output trigger pulse can be applied to the clamper 23.

The clamper 23 also has the saw-tooth voltage applied to it over lead 24 from the input saw-tooth oscillator 14.

Therefore, at the instant that the clamper 23 receives its trigger pulse from the normal gate 21, it results in the particular amplitude of the saw-tooth voltage existing at that instant to be applied through the clamper to the storage circuit 18. The storage circuit 18 then stores this new voltage amplitude representing the period between the last two received pulses.

The local saw-tooth oscillator 25 operates independently of the input saw-tooth oscillator 14. The local saw-tooth oscillator 25 has its frequency of operation governed by the storage circuit 18 acting through the amplitude comparison circuit 26. This amplitude comparison circuit receives an input over lead 27 from the storage circuit 18 that represents the voltage then stored in the storage circuit. The amplitude comparison circuit also has applied to it the saw-tooth voltage wave of the local saw-tooth oscillator 25. As the output voltage of this oscillator 25 rises, it eventually reaches the level of voltage applied to the comparison circuit 26 over lead 27. Each time this happens, a triggering input is applied by the comparison circuit 26 to the saw-tooth oscillator 25 over lead 28 to restore the saw-tooth oscillator.

The local saw-tooth oscillator 25 is adjusted so that its voltage rise time or slope of its output voltage exactly equals that of the input saw-tooth oscillator 14. This is graphically illustrated in Fig. 3 by comparing lines B and C. Therefore, since the storage circuit 18 continuously stores a voltage which represents the maximum amplitude of the voltage generated by the input oscillator 14 before it was triggered to its low voltage state and since this is the same voltage that the local oscillator 25 is allowed to generate prior to its triggered return, then the equal slope of output voltages results in the local oscillator 25 operating at exactly the same frequency as the input oscillator 14.

The level of voltage stored in the storage circuit is unaffected by a momentary erratic condition of the input signal because measured periods differing considerably from that stored in the storage circuit are rejected; thus, it follows that the local saw-tooth oscillator 25 is also unaffected by such conditions. As a result, the reception of extra pulses or the missing of pulses for a brief interval, either of which will cause the input saw-tooth oscillator to operate irregularly, will not affect the local saw-tooth oscillator 25 which will continue to generate its saw-tooth wave of voltage at a frequency determined by the voltage then being stored in the storage circuit 18.

Figure 3:
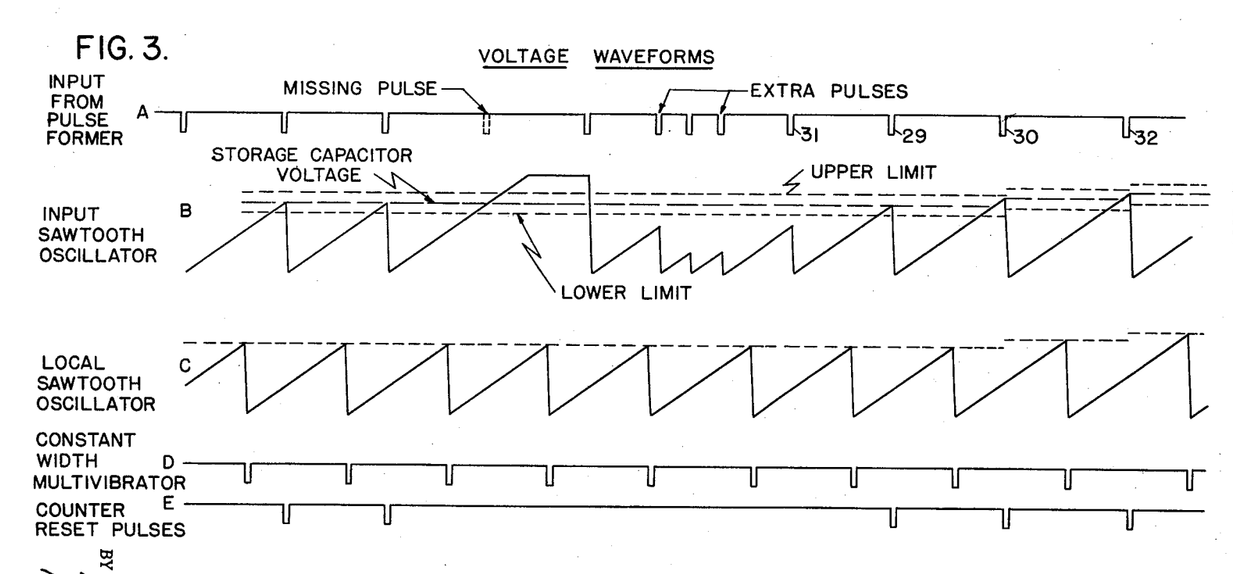
Fig. 3 is a wave-form diagram representing variations of voltage at various places in the circuit diagram of Figs. 2A and 2B.

This operation is also graphically illustrated in Fig. 3. At line B, it is shown that the period of the received pulses establishes a particular level of voltage corresponding to the peak amplitude of the saw-tooth wave before it is restored, and this voltage is stored in the storage circuit. When a pulse is missing as indicated at line A, then the saw-tooth voltage wave is not restored at the usual time but is allowed to continue increasing until it reaches some upper limiting level which is substantially above the upper limit indicated at line B. When the saw-tooth is restored by the next pulse, the amplitude of the oscillator output voltage is so high that it is rejected by the upper-lower limit check circuit 15 and this voltage is then not impressed upon the storage circuit 18.

The effect of extra pulses is also indicated. Thus, the occurrence of an extra pulse causes the saw-tooth voltage wave to be restored before it has risen above the lower limit. The amplitude of the saw-tooth wave is then too low at the sampling instant occurring just prior to its return to be accepted so that this voltage is then also not impressed upon a storage circuit. It is only when the amplitude of the saw-tooth wave is within acceptable limits at the instant of sampling of the voltage then stored in the storage circuit 18 that this voltage can be impressed upon the storage circuit.

Lines A and B of Fig. 3 also illustrate how the stored voltage can change as the period of the pulses gradually varies. Thus, the interval between pulses 29 and 30 is shown as being somewhat longer than the interval between pulses 31 and 29. As a result, the peak amplitude of the saw-tooth wave at the time of occurrence of pulse 29 is greater than it was at the time of occurrence of the pulse 31 but it is still less than the upper limit established at the time of pulse 31 so that the new higher voltage corresponding to this longer period can be stored in the storage circuit. The interval between pulses 30 and 32 is still somewhat longer but since the increase is a gradual one the change of voltage at the moment of sampling is within acceptable limits of the voltage then being stored. The stored voltage can be changed to correspond and thus represent the newly measured period.

As shown at line C, the local saw-tooth oscillator 25 having its slope identical to that of the input saw-tooth oscillator 14 has its frequency governed by the voltage provided by the storage circuit. As a result, the frequency of operation of this oscillator 25 matches the frequency of the input oscillator 14 when that is operating properly, but it is evident that the local oscillator is unaffected by the momentary erratic operations of the input saw-tooth oscillator 14 resulting from the missing and extra pulses indicated at line 8.

The constant width multivibrator 33 of Fig. 1 is operated by trigger pulses received from the amplitude comparison circuit 26 each time that this circuit provides a triggering input to the local saw-tooth oscillator to restore it to its low level voltage condition. The constant width multivibrator responds to each trigger pulse by generating an output pulse of a particular width. These pulses are applied to a discriminator 34 which is governed by the frequency of these pulses and acts upon the automatic retarder control circuits 35 to control the retarder operating mechanism 36 so that the car retarder will release its braking effect upon a car when the speed of such car has been reduced to a predetermined value.

This is accomplished in the discriminator through the action of relay control circuits such as the speed relay control circuit and anticipation relay control circuit shown in the previously mentioned Kendall et al. application, Ser. No. 513,364. In such an organization, the speed relay drops away and thereby causes the release of the retarder when the frequency of the constant width pulses applied to the speed relay control circuit reaches a particular value indicating that the vehicle speed has reached a certain predetermined level. The beat frequency value and thus the corresponding car speed at which this occurs may be for any desired vehicle speed, thereby providing a continuously variable control over the retarder releasing speed.

Each time that the local saw-tooth oscillator 25 has its output voltage restored by the amplitude comparison circuit 26, a trigger pulse is also applied to the gated counter driver 37 which then applies a pulse to a counter 38. However, this counter 38 also receives a resetting input from the normal gate 21. Thus, even though each operation of the local saw-tooth oscillator 25 results in a count of 1 being applied to the counter 38, this counter is immediately restored to the 0 state by the output pulse it receives when the normal gate 21 has been triggered to give a pulse to the clamper 23 in the manner previously described. If the normal gate 21 is not triggered in this manner, then the counter 38 will not be reset to 0. From the description previously given, it is evident that the normal gate 21 is not triggered when the amplitude of the input saw-tooth oscillator at he insant of sampling is not within the predetermined limit of the voltage then stored in the storage circuit 18. In other words, if the input signal becomes erratic so that the normal gate cannot operate in the customary manner, the local saw-tooth oscillator 25 will continue to operate in accordance with the voltage stored in the storage circuit. For each such independent operation, the counter 38 is advanced by one count, since it cannot now be reset by the normal gate. Naturally, if such independent operation of the saw-tooth oscillaor continues for too long a time, it may after a while no longer represent by its frequency of operation the actual vehicle speed. It is then no longer reasonable to assume that the frequency of the local oscillator represents actual car speed since the car speed may, in the meantime, have changed appreciably from what it was at the time the signal became erratic.

The count stored in the counter 38 thus represents the number of times that the local saw-tooth oscillator has operated without any new input signal having been effective to provide fresh speed information to be, in effect, stored in the storage circuit 18. When this count reaches a predetermined value, which in one case was selected to be 15 and thus represented a distance of travel of the vehicle of about 40 inches, then the counter decoder 39 responds to the condition of such a count in the counter by supplying a conditioning input to the lock-on gate 40. When the lock-on gate is thus conditioned, it responds in a manner similar to the normal gate 21 with the exception that the lock-on gate does not require that the flip-flop gate 16 be open. In other words, the lock-on gate will permit the sampling of the voltage of the input saw-tooth oscillator at the instant of return of the sawtooth independently of whether the amplitude is then within the prescribed limits of the voltage then stored in the storage circuits 18. Thus, the sampling circuit provides an input pulse over lead 22 to the lock-on gate 40 upon each input pulse applied thereto from the pulse former 12. The lock-on gate provides an output trigger over lead 41 to the clamper 23 so that the then existing amplitude of voltage of the saw-tooth oscillator 14 appearing on lead 24 can be impressed through this clamper 23 upon the storage circuit 18. The lock-on gate thus functions to "search" for a new pulse period to be stored in the storage circuit. As soon as two successive measured periods are nearly alike, the normal gate 21 will again function in its customary manner and provide a resetting input to the counter 38. When this happens, the counter is reset to its 0 condition and the counter decoder 39 then removes the conditioning input from the lock-on gate 40 so that operation will be in the usual manner.

While the counter decoder 39 is effective to provide the conditioning input to the lock-on gate 40, it also provides an output over lead 42 to the gated counter driver 37 which makes the counter driver ineffective to operate the counter. This is done to prevent further operation of the counter since it is desired under these circumstances to hold the counter in the condition where it is able to supply the input to the counter decoder 39 that maintains the conditioning input effective on the lock-on gate. More specifically, if a four-stage binary counter is used for the counter 38, this counter will, after receiving 15 input pulses from the amplitude comparison circuit 26 through the gated counter driver 37, be in the condition where all its four stages are in the 1 state. The counter decoder 39 responds to this particular condition by providing the desired conditioning input to the lock-on gate. It is then necessary to stop further counting by blocking the gated counter driver over lead 42 since one additional count to the counter 38 would result in the restoration of all the four stages to their 0 condition so that the counter would then be storing a 0 count and would no longer be able to act on the counter decoder to supply a conditioning input to the lock-on gate.

Figure 2A:
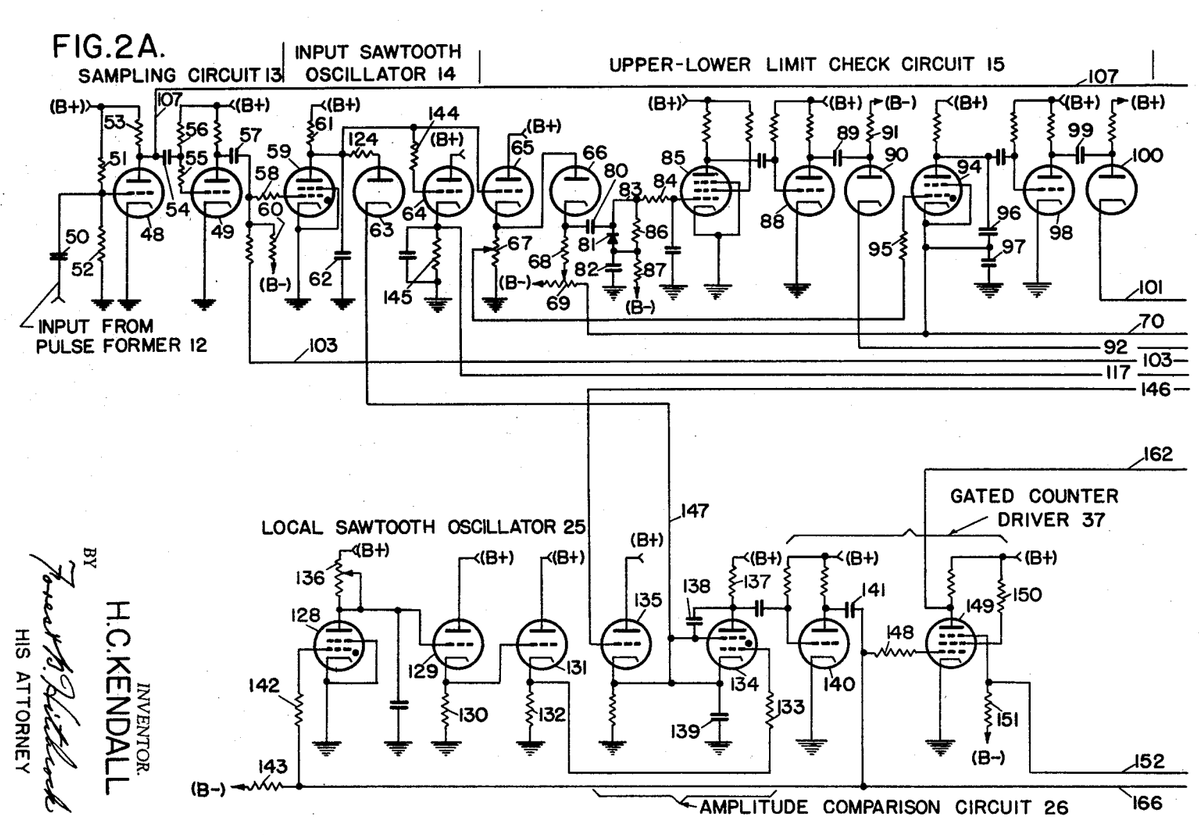
Figs. 2A and 2B, when placed with Fig. 2B to the right of Fig. 2A, constitute a circuit diagram disclosing one specific embodiment of this invention.
Figure 2B:
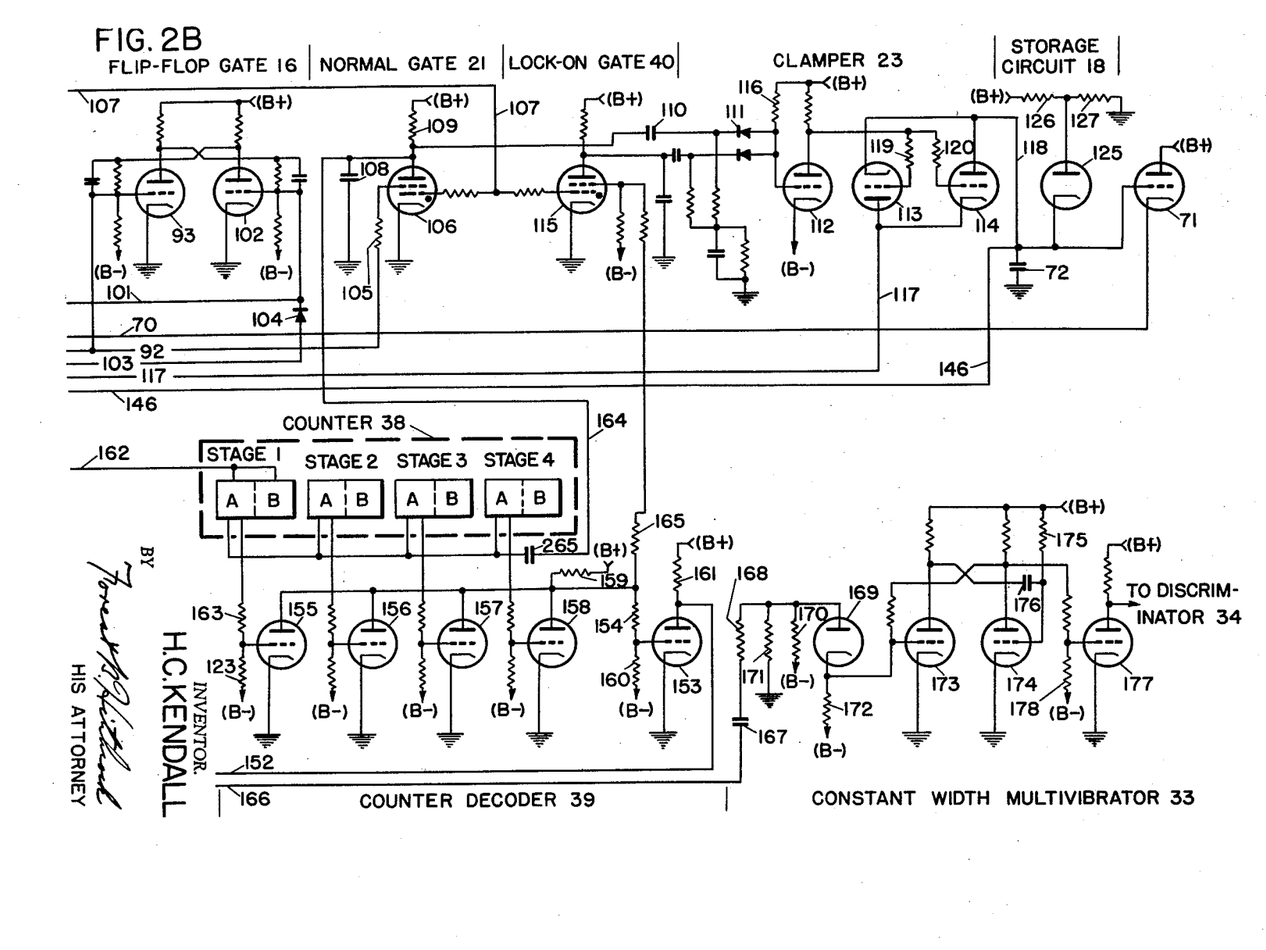

*Description of detailed circuits—Figs. 2A and 2B*

The sampling circuit is shown in Fig. 2A as including a pulse amplifier tube 48 and a differentiating amplifier tube 49. Tube 48 has the negative-going input pulses from the pulse former 12 (see Fig. 1) applied to its control grid through coupling capacitor 50. This control grid is connected to the junction of resistors 51 and 52 connected between (B+) and ground. The resulting positive bias causes this tube 48, therefore, to be normally in a conductive condition. Its plate voltage is thus normally low because of the voltage drop across resistor 53. Each negative-going input pulse on the grid causes the tube to be driven to cut off so that the plate voltage then rises. The result is that a voltage pulse appears at the plate that is substantially an inversion of the input grid pulse.

Each positive-going plate pulse is applied through capacitor 54 and resistor 55 to the control grid of the differentiating amplifier tube 49. Since the grid of tube 49 is connected through the series resistors 55 and 56 to (B+), this tube is normally in a conductive state, but its grid is prevented from rising an appreciable amount above the cathode because the grid current that flows through the large resistance provided by these resistors 55 and 56 holds the potential of the grid near that of the grounded cathode.

Upon the leading edge of the positive-going trigger pulse at the plate of tube 48, capacitor 54 charges, thereby raising the voltage at the junction of resistors 55 and 56. The voltage at the grid of tube 49 is prevented from rising, however, since any attempt of the grid to rise merely results in an increase of grid current without permitting any appreciable voltage rise across the relatively low cathode-grid resistance.

At the time of the trailing edge of the positive-going pulse at the plate of tube 48, there is a discharging of capacitor 54 through the relatively high resistance of resistor 56 and the now conductive plate-cathode circuit of tube 48. This discharge current results in an abrupt decrease of voltage at the junction of resistors 55 and 56 and also at the grid of tube 49. Tube 49 is thus made momentarily nonconductive for a time that is dependent upon the time constant for the discharging of capacitor 54. After a brief interval, tube 49 is restored to its normal conductive state, but while it is momentarily nonconductive, its plate voltage experiences an abrupt rise, thereby forming a sharply peaked positive-going trigger pulse.

The manner of operation of the differentiating amplifier comprising tube 49 has been described in rather considerable detail because pulse forming circuits of this type are used frequently in the circuit organization of this invention. It is, consequently, believed necessary only to point out in the following description where such pulse formers are used that a positive-going trigger pulse results each time that there is a negative-going voltage variation applied to the input circuit of such pulse former.

The positive-going trigger pulse appearing at the plate of tube 49 for each pulse obtained from the pulse former 12 is applied through a coupling capacitor 57 and resistor 58 to the control grid of a gas discharge tube 59 included in the input saw-tooth oscillator 14. This control grid is normally biased negatively beyond cutoff with respect to the grounded cathode by being connected through resistors 58 and 60 to the (B—) source of voltage. The plate of tube is connected through resistor 61 to the (B+) voltage source, and the plate is connected also through capacitor 62 to ground.

When a positive-going trigger pulse appears at the grid of tube 59 with sufficient amplitude, the tube is fired. A gas discharge tube has the characteristic that when fired it tends to remain in that state unless its plate-cathode current is interrupted because the grid loses control of the tube after it has fired. By connecting the capacitor 62 from the plate of tube 59 to ground and by causing the plate resistor 61 to have a relatively large value of resistance, the gas discharge tube is made to be self-quenching. More specifically, when the tube is nonconductive, its plate voltage is high, and the capacitor 62 is charged to this high voltage. At the instant the tube is fired, the capacitor 62 discharges through the plate-cathode circuit, thereby producing an abrupt drop of plate voltage. The resistor 61 in the plate circuit is of such a large value that it does not ordinarily permit a sufficient flow of plate current to sustain conduction so that, upon the discharge of capacitor 62, the tube reverts to a non-conductive state. This condition is aided by an oscillatory "bottoming" of the plate voltage resulting from an oscillatory voltage variation produced by the inneraction of the capacitor 62 with whatever inductive reactance is present in the plate-cathode circuit resulting from wire connections and the like. Thus, it has been observed that the plate voltage, upon the instant of firing, momentarily oscillates to a value lower than that required to sustain conduction with the result that the tube is quickly extinguished. The result of this operation, therefore, is that a positive trigger pulse at the grid results in the firing of the tube so that the plate voltage quickly drops to a low level.

When tube 59 has been extinguished, the discharged capacitor 62 begins to charge again through the high resistance of plate resistor 61. As the capacitor 62 charges, the plate voltage of tube 59 rises to provide the rising portion of the saw-tooth wave form shown at line B of Fig. 3. Although the charging of capacitor 62 occurs exponentially, the saw-tooth oscillator is so operated under normal circumstances that capacitor 62 charges only partially before another input pulse fires tube 59 and restores the plate voltage abruptly to its low level. As a result, by using only the first portion of the exponential capacitor charging curve, the resulting wave form of the plate voltage of tube 59 is relatively linear with respect to time and thus closely approximates the straight line relationship shown in Fig. 3 at line B.

The saw-tooth plate voltage of the gas discharge tube 59 is applied through a number of diodes and cathode followers including tubes 63, 64, 65 and 66 to various circuits whose operation will shortly be described in detail. The saw-tooth voltage is applied, for example, to the plate of cathode follower tube 65 so that it appears across the cathode potentiometer 67 of this cathode follower tube. This voltage is supplied to the plate of diode 66. The cathode of diode 66 is connected through a resistor 68 to a tap on the potentiometer 69. The left-hand terminal of this potentiometer 69 is connected to (B—) while the right-hand terminal is connected over wire 70 to the cathode of the cathode-follower tube 71 included in the storage circuit 18.

In this storage circuit 18, the capacitor 72 stores the last peak saw-tooth voltage that was found to be within acceptable limits, thereby representing valid speed information. The voltage on this capacitor is applied to the grid of cathode-follower tube 71 so that a corresponding voltage appears at all times on the cathode of this tube and on wire 70. Since the voltage at the right-hand terminal of potentiometer 69 thus represents the voltage stored on capacitor 72 and the left-hand terminal is connected to (B—), the voltage at the tap of the potentiometer is always less than the voltage then stored by a certain amount as determined by the position of the tap. Thus, it might be considered that the voltage at the tap of potentiometer 69 represents the lower limit of voltage which is shown at line B of Fig. 3 as being a prescribed amount below the then stored voltage on capacitor 72.

As long as the amplitude of the saw-tooth voltage wave at the plate of diode 66 is below this lower limit voltage, there can be no conduction of this diode because its plate is then at a voltage below that of the cathode. However, as the saw-tooth voltage rises above the lower limit, there suddenly exists a difference of potential across the diode as the plate is rapidly driven positive with respect to the cathode. As soon as this condition is reached, diode 66 conducts and raises the voltage at the cathode of this diode. As a result, there is an increase in voltage on wire 83 that is effective through resistor 84 on the grid of tube 85. This tube is normally biased to be cut-off since its grid is connected through resistor 84 as well as the series-connected resistors 86 and 87, to (B—). However, the rising of the saw-tooth voltage above the lower limit causes the tube to become conductive so that its normally high plate voltage is suddenly dropped in value. When the saw-tooth voltage abruptly returns to its lowest value, capacitor 80, which charged slightly while diode 66 was conductive, discharges through rectifier 81 and capacitor 82.

Tube 88 is operated as a differentiating amplifier similar in operation to that previously described in connection with tube 49 of the sampling circuit 13. Therefore, each time that tube 85 becomes conductive and produces a negative-going voltage variation at its plate, tube 88 responds by producing a positive-going trigger pulse at its plate. This positive-going trigger pulse is applied through coupling capacitor 89 to the plate of diode 90. The plate of this diode is connected through resistor 91 to (B—). The cathode is connected over wire 92 to the control grid of tube 93 of the flip-flop gate 16. Since diode 90 has its plate normally at a negative potential, the positive-going trigger pulse applied to the plate through coupling capacitor 89 must necessarily be of a substantially large amplitude to overcome this negative bias and permit the diode to conduct. The result is that a positive-going trigger pulse can appear on wire 92 and affect the grid-cathode voltage of tube 93 only in response to a legitimate input signal and is substantially unaffected by noise pulses which might produce small positive-going triggers at the plate of diode 90 and thus otherwise erroneously affect the grid circuit of tube 93.

The purpose of the pulse appearing on the grid of tube 93 of the flip-flop gate 16 when the saw-tooth voltage has been detected as exceeding the lower limit is to operate the flip-flop gate to the "open" condition so that the normal gate 21 can be conditioned. Before describing in detail the operation of the flip-flop gate 16 and the normal gate 21, it is believed desirable to explain how this gate is closed in the event that the saw-tooth voltage is allowed to rise above the upper limit before the restoration of the saw-tooth by an input pulse.

The flip-flop gate 16 is closed if the saw-tooth voltage rises above the upper limit by action of the gas discharge tube 94 included in the upper-lower limit check circuit. As previously described, the voltage appearing on wire 70 represents the voltage stored in the storage circuit 18 at that time. This voltage is applied directly to the cathode and shield grid of gas discharge tube 94. At the same time, the control grid of this tube 94 is connected through grid current limiting resistor 95 to a tap on the potentiometer 67 included in the cathode circuit of cathode follower 65 so that this grid voltage is proportional to the amplitude of the saw-tooth wave. When the saw-tooth voltage amplitude (tube 94 grid voltage) has risen sufficiently with respect to the stored voltage (tube 94 cathode voltage), the tube is fired. A gas discharge tube ordinarily is fired when its grid is still at some negative potential with respect to the cathode. It is for this reason that the grid voltage of tube 94 is selected to be at some level that is below the actual saw-tooth voltage amplitude, in order that the tube will fire precisely when the saw-tooth voltage is at the desired level above the storage voltage to constitute the desired upper limit. To accomplish this, the grid voltage is obtained from a tap on the potentiometer 67 which is properly positioned to cause the gas discharge tube 94 to fire when the saw-tooth amplitude is at the desired level relative to the voltage then appearing on wire 70 that represents the stored voltage.

Upon the firing of gas discharge tube 94, the capacitors 96 and 97 connected in series between plate and ground quickly discharge thereby providing the self-quenching action previously described in connection with gas discharge tube 59. Tube 94 is, therefore, only momentarily conductive but while in this condition it is effective to provide a negative-going trigger pulse at its plate which acts upon the differentiating amplifier circuit comprising tube 98 to give a positive-going trigger pulse at the plate of this tube. This positive-going trigger pulse is applied through the coupling capacitor 99 to the plate of diode 100 which is connected in a manner similar to that already described for diode 90. Thus, a positive-going trigger pulse is applied over wire 101 to the grid of tube 102 included in the flip-flop gate. This pulse has the effect of closing the flip-flop gate 16.

The flip-flop gate 16 comprises two interconnected triode tubes to form an Eccles-Jordan trigger circuit of a kind common in the art. This circuit is a bi-stable state organization wherein one tube is at any one time conductive and acts on the other tube to hold it nonconductive. Likewise, the nonconductive tube provides a feedback voltage to the other tube to maintain it conductive. The state of the flip-flop may be reversed by applying a triggering input to either tube grid. The flip-flop gate 16 is considered to be in the open state when tube 93 is conductive and tube 102 nonconductive. In the opposite state, the gate is closed.

From the description already given, it is evident that when the saw-tooth voltage wave has risen above the lower limit, a positive-going trigger pulse appears at the grid of tube 93 and operates the flip-flop circuit to the condition wherein tube 93 is conductive and tube 102 nonconductive so that the gate is open. If the sawtooth voltage wave rises above the upper limit, then a positive-going trigger pulse appears over wire 101 on the grid of tube 102 and closes the gate by making tube 102 conductive and the opposite tube 93 nonconductive.

Under normal circumstances, the saw-tooth voltage wave rises above the lower limit to open the flip-flop gate 16 but does not rise above the upper limit to again close the gate. In order that the flip-flop gate 16 can be restored to its normal closed condition at the start of each saw-tooth wave, an input pulse is applied to it over wire 103 from the sampling circuit 13 of Fig. 2A. The positive-going trigger pulse at the plate of tube 49 that results in the firing of tube 59 to initiate a new saw-tooth wave also acts through rectifier 104 on the grid of tube 102 to make this tube conductive and tube 93 nonconductive to thereby close the flip-flop gate 16.

When the flip-flop gate is closed, the voltage at the grid of tube 93 is substantially below ground to hold this tube nonconductive so that a low voltage appears on wire 92 and is applied through a decoupling resistor 105 to the shield grid of tube 106 included in the normal gate 21. This negative voltage prevents tube 106 from being fired. When the flip-flop gate 16 is open, the voltage at the grid of tube 93 is substantially the same as that of the cathode of this tube which is at ground. Therefore, when the gate is open, the shield grid of gas discharge tube 106 is at ground potential so that the tube can then be fired provided that its control grid is then above the firing level for the tube.

Gas discharge tube 106 receives the required control grid voltage over wire 107 from the sampling circuit 13 of Fig. 2A. From the description that has already been given, it is evident that the input sawtooth oscillator 14 initiates a new sawtooth wave upon the trailing edge of each positive-going pulse appearing at the plate of tube 48 of the sampling circuit 13. However, upon the leading edge of each pulse at the plate of tube 48, the voltage on wire 107 rises so that the grid voltage of gas discharge tube 106 of the normal gate 21 rises above the firing level to permit this tube to conduct. The operation of the normal gate 21 is, therefore, such that this tube will fire just prior to the initiation of a new sawtooth wave provided that the flip-flop gate is then open. Since the flip-flop gate 16 can then be open only if the sawtooth wave is at that instant within the predetermined levels as determined by the upper-lower limit check circuit 15, this means that the firing of tube 106 is an indication that the sawtooth voltage amplitude at the instant of sampling is within the prescribed limits and should be stored in the storage circuit as representing the latest valid information regarding the period of the received pulses. If the normal gate tube cannot be fired at this time, it is an indication that the sawtooth voltage is either above the upper limit or below the lower limit so that it could not cause the flip-flop gate 16 to be open at the sampling instant. In that event, the amplitude of the sawtooth voltage should not be applied to the capacitor 72 of the storage circuit 18 and for this reason tube 106 is not fired.

A capacitor 108 and plate load resistor 109 are associated with gas discharge tube 106 in a manner to make this tube self-quenching. Therefore, tube 106 remains conductive for only a brief interval when it is fired. The time constant for the recharging of capacitor 108 is relatively short so that the momentary firing of this tube produces a brief negative-going trigger pulse at the plate.

This negative-going trigger pulse is applied through a coupling capacitor 110 and rectifier 111 to the control grid of tube 112 included in the clamper 23. Tube 112 operates as a differentiating pulse former in a manner similar to that described for tube 49. Thus, a negative-going voltage variation at the grid of this tube which makes tube 112 momentarily nonconductive causes the plate voltage to rise from its normal value which is substantially below ground to a voltage that is near the (B+) level. This causes the two clamping triode tubes 113 and 114 to be driven to conduction.

The distinctive feature of clamper 23 is that the cathode of tube 112 is connected directly to (B—) rather than to ground. As a result, the normal plate voltage of this tube is below ground and is thus able to hold tube 113 cutoff even when the voltage across capacitor 72 is low. The rectifier 111 in the grid circuit of pulse former tube 112 is provided to isolate the plate circuit of the gas discharge tube 106 from gas discharge tube 115 of the lock-on gate 40. Therefore, when tube 106 is fired, some current may be drawn through the resistor 116 to lower the grid voltage of tube 112, but it is not possible to have any appreciable amount of current pass from the plate circuit of tube 115 through rectifier 111 in the reverse direction so that the plate circuit of tube 115 is substantially unaffected.

Tubes 113 and 114 of the clamper 23 are connected with the plate of one to the cathode of the other. This is done to insure that one or the other of these tubes will conduct regardless of the relative polarity of the voltages appearing on wire 117 and on wire 118. In other words, if the voltage of the sawtooth at the moment of sampling is either more or less than the voltage then stored in capacitor 72, one or the other of tubes 113 or 114 will be made momentarily conductive when their normal cutoff grid bias is momentarily overcome so that the capacitor 72 can charge or discharge as the case may be equal the voltage then appearing on wire 117.

By connecting the cathode of tube 112 to (B—) rather than to ground, it insures that the voltage normally present on the grids of the two tubes 113 and 114 is considerably below ground and therefore able to maintain both tubes fully cut-off. Consequently, if the cathode of one of the tubes such as tube 114 is at or near ground potential, the considerably negative grid voltage it normally receives from the plate of tube 112 causes this tube to be fully cut-off. The two resistors 119 and 120 have the effect of isolating the grids of tubes 113 and 114 from the plate circuit of tube 112.

During the brief interval that the two clamping tubes 113 and 114 have their cut-off bias removed, the effect is of momentarily connecting the upper terminal of capacitor 72 to wire 117 so that the capacitor 72 can quickly charge or discharge as required and thus assume the voltage then existing on wire 117. An auxiliary charging circuit is provided for this storage capacitor to prevent its voltage from fully discharging during intervals when no signal is received for a time. The purpose of this is to present the rate of operation of the local oscillator from reaching unusually high values. This is accomplished by connecting the upper terminal of capacitor 72 to the cathode of diode 125. The plate of this diode is connected to the junction of the voltage dividing resistors 126 and 127 connected between (B+) and ground. Any tendency of the capacitor voltage to drop below the voltage at the plate of the diode 125 then results in a charging action to maintain the capacitor voltage at this lower limiting value.

The local saw-tooth oscillator 25 shown in Fig. 2A comprises a gas discharge tube 128 operating in a manner similar to that described for tube 59 of the input saw-tooth oscillator 14. The rising saw-tooth voltage appearing at the plate of this tube is applied to the control grid of a cathode follower tube 129. The output voltage appearing across the cathode resistor 130 is applied to the control grid of another cathode follower tube 131. The output of this cathode follower which appears across its cathode resistor 132 is applied through a decoupling resistor 133 to the control grid of gas discharge tube 134 included in the amplitude comparison circuit 26.

The amplitude comparison circuit 26 also includes a cathode follower tube 135 whose control grid is connected directly over wire 146 to the upper terminal of the capacitor 72 included in the storage circuit 18. The output voltage of this cathode follower tube 135 obtained at its cathode thus corresponds to the voltage stored at any instant in the storage capacitor 72. This voltage is applied to the cathode of the gas discharge tube 134. Consequently, the grid-cathode voltage of this tube 134 is dependent upon the relative levels of two different voltages. The cathode voltage varies according to the voltage stored in the capacitor 72; the grid voltage varies according to the instantaneous level of output of the local saw-tooth oscillator 25. This circuit organization is so adjusted with respect to operating values that tube 134 will fire each time that the output voltage of the local saw-tooth oscillator appearing at the plate of tube 128 reaches the level of the voltage stored in the storage capacitor 72.

Each time that gas discharge tube 134 of the amplitude comparison circuit 26 is fired, a negative-going trigger appears at the plate of this tube. This negative-going trigger pulse is of short duration since this tube has associated with it the quenching circuit comprising plate resistor 137 and capacitors 138 and 139 connecting the plate to ground. Each of these negative-going trigger pulses produces a positive-going trigger pulse at the plate of tube 140. Each of these positive-going trigger pulses is then applied through a coupling capacitor 141 to the control grid of gas discharge tube 128. Each pulse is of an amplitude sufficient to overcome the negative bias effective on the grid of tube 128 as a result of the connection of the grid through resistors 142 and 143, to (B—). Therefore, tube 128 is fired resulting in an abrupt return of its plate voltage to initiate a new saw-tooth voltage wave as shown at line C of Fig. 3.

The plate circuit of gas discharge tube 128 included in the local saw-tooth oscillator includes a variable potentiometer 136. This potentiometer is set to give a slope of the output saw-tooth wave that exactly equals the slope of the saw-tooth oscillator 14. Therefore, since both saw-tooth oscillators have the same slope of their output voltage, the triggering of tube 128 each time its output voltage reaches the then stored voltage in capacitor 72 means that the local saw-tooth oscillator 25 is operating at exactly the same rate as the input saw-tooth oscillator, assuming that the input oscillator is not operating erratically as a result of disturbances in the input signal from the radar.

The output of the local saw-tooth oscillator tube is applied to two cathode followers in succession comprising tubes 129 and 131. This is done to compensate for the fact that the output of the saw-tooth oscillator tube 59 is also required to pass in succession through two cathode follower tubes. Thus, the plate voltage of gas discharge tube 59 is applied through resistor 144 to the control grid of cathode follower tube 64. The output of this cathode follower appearing across its cathode load resistor 145 is applied over wire 117 to the plate and cathode of tubes 113 and 114, respectively. This voltage is then applied to capacitor 72 at the moment of sampling. The voltage appearing across the storage capacitor 72 is then applied over wire 146 to the control grid of the second cathode follower tube 135. Passing the output voltage of tube 128 through two cathode followers before comparing it with the voltage stored in the storage capacitor tends to compensate for any effects on the relative amplitudes or linearities of the two voltages, thereby making it possible for the local saw-tooth oscillator to be precisely controlled in accordance with the measured rate of operation of the input saw-tooth oscillator 14.

As shown in Fig. 3 at line B, the input saw-tooth oscillator voltage rises in a generally linear manner and continues to do so until limited at some upper value which is slightly above the voltage that is then stored in the storage capacitor 72. This limiting of the peak voltage of the oscillator tube 59 is accomplished by the action of diode 63. The cathode of this diode is connected directly to the cathode of cathode follower tube 135 included in the amplitude comparison circuit 26. The plate of diode 63 is connected through a voltage dropping resistor 124 to the plate of gas discharge tube 59. When the voltage at the plate of tube 59 has risen to a value above that appearing on wire 147, diode 63 will conduct. By action of the voltage divider made up of resistors 124 and 61 and diode 63, the voltage to which the plate of tube 59 can rise is limited to a value slightly above that appearing on line 147.

Each time that a new local saw-tooth wave is initiated, a positive-going trigger pulse is applied through decoupling resistor 148 to the control grid of the pentode amplifier tube 149. The screen grid of this tube is biased positively by being connected through voltage dropping resistor 150, to (B+). The suppressor grid is gated, however. Thus, it is connected through resistor 151, to (B—) and is also connected over wire 152, to the plate of triode amplifier tube 153 shown in Fig. 2B. The control grid of tube 153 is connected through resistor 154 to the plates of the various tubes 155—158. As will presently be described, one or more of these tubes is ordinarily conductive so that there is a voltage drop across the common plate load resistor 159 of these tubes. This causes these tubes to have a relatively low plate voltage which is insufficient to overcome the negative bias voltage applied to the control grid of tube 153 from (B—) through resistor 160. Tube 153 is, therefore, ordinarily nonconductive with no voltage drop across its plate load resistor 161 so that its plate voltage is at a high level. There is thus, in effect, a voltage divider comprising this plate resistor 161 and resistor 151 in the screen grid circuit of tube 149 that normally causes this screen grid to have a relatively high potential applied to it. Therefore, tube 149 can be made momentarily conductive by each positive-going trigger pulse it receives on its control grid from the plate of tube 140.

Each time that tube 149 is made momentarily conductive in this manner, its plate voltage is abruptly lowered to provide a negative-going trigger pulse over wire 162 to the counter 38. This counter may be of a conventional type employing a plurality of Eccles-Jordan trigger circuits of the general type shown for the flip-flop gate 16. Such counters are very well-known in the art so that it is not believed necessary to disclose it in detail here or to describe in detail how it operates. Briefly, each stage includes two tubes with one or the other being conductive and the other nonconductive. Each input pulse appearing on wire 162 results in the operation of stage 1 of the counter to the opposite condition to that which it is then in. Each second operation of stage 1 provides an input pulse to stage 2 to operate it to its opposite condition. The same operating occurs with respect to the operation of the successive stages.

Normally each stage is in the condition where the left-hand or "A" tube of its stage is in the nonconductive condition and with the "B" tube conductive. A connection is made from the plate of each "A" tube through a corresponding resistor such as resistor 163 to the control grid of a respective triode amplifier tube 155. When the "A" tube is conductive, the corresponding triode amplifier tube such as tube 155 receives a relatively low voltage from the plate of the "A" tube so that the negative grid bias it is then receiving from the (B—) source through resistor 123 cannot be overcome so that the tube is nonconductive. However, when the "A" tube is nonconductive, its plate voltage is at a high level, thereby causing the corresponding tube such as tube 155 to be conductive.

With a four-stage counter such as shown in Fig. 2B, the application of 15 input pulses to the counter over wire 162 results in each of the four stages being in the condition where its "A" tube is conductive. When this happens, all of the triode amplifier tubes 155—158 are biased to cut-off so that there is then no voltage drop across their common plate load resistor 159. This causes the normal cut-off bias of triode amplifier tube 153 to be overcome so that this tube conducts with a resulting decrease of its plate voltage. As soon as this happens, the voltage on the suppressor grid of tube 149 is lowered so that this tube cannot be made conductive by further input pulses applied to its grid. Therefore, no further input counts can be applied to the counter 38 over wire 162.

The counter 38 receives an input over wire 164 from the plate circuit of tube 106, of the normal gate 21. This is a resetting input pulse of negative polarity (see line E of Fig. 3) occurring each time that tube 106 is made momentarily conductive in the manner previously described. Each such negative-going pulse is applied through the coupling capacitor 265 to the "A" tube of each stage of the counter and restores each stage to its normal condition where its "A" tube is nonconductive. This "zeroing" of the counter 38 causes each of the triode amplifier tubes 155—158 to become conductive since the control grid of each of these tubes is then raised above cut-off by the high plate voltage it receives from its associated nonconductive "A" tube. From the description already given, it is evident that this action produces a high suppressor grid voltage for tube 149 so that this tube can be made conductive and thus supply the negative-going input pulses required for the counter 38 to operate.

The overall effect of this circuit organization involving the counter 38 is that the counter receives an input count for each operation of the local saw-tooth oscillator 25. However, the counter is, under normal conditions, immediately reset each time after receiving one input count by the negative-going resetting pulse it receives from the normal gate 21. Such a resetting pulse is provided by the normal gate each time that the input saw-tooth oscillator voltage at the instant of sampling is within the prescribed limits. However, if the input signal becomes erratic so that the voltage of the input saw-tooth oscillator at the instant of sampling is not within prescribed limits, then tube 106 of the normal gate will not operate. Consequently, the counter 38 will receive successive input counts over wire 162 without receiving corresponding resetting inputs from the normal gate 21. If this occurs for a sufficiently long time for the counter to reach a predetermined count, such as 15 counts in the organization disclosed, then the counter is prevented from receiving input counts and remains at the count of 15 so that all four triode amplifier tubes remain in the nonconductive state.

In addition, a relatively high positive voltage is applied from the common plate circuits of these tubes 155—158 through decoupling resistor 165 to the shield grid of tube 115 of the lock-on gate 40. Tube 115 of the lock-on gate 40 is thus in condition to respond and will fire each time that it receives a positive trigger pulse over wire 107 from the sampling circuit 13. The lock-on gate 40 thus operates in a manner somewhat similar to the normal gate 21 with the exception that tube 115 is not gated so as to respond only if the saw-tooth voltage at the instant of sampling is within acceptable limits. The lock-on gate 40 will have its tube 115 fired for each input pulse applied to the sampling circuit 13. When it fires, it acts upon the clamper 23 in the same manner as the normal gate 21 so that the then existing amplitude of the saw-tooth wave will be applied to the capacitor 72 to change the charge thereon. Thus, it might be considered that the conditioning of the lock-on gate 40 results in a searching action. The local saw-tooth oscillator 25 has operated for 15 counts without receiving new information as to the period of the input signal. It is then considered necessary to ignore what is stored in the storage circuit 18 and search for more valid information.

As soon as the sampled voltages on two successive times are within reasonable limits of each other as detected by the upper-lower check circuit 15, the normal gate 21 will again be operated in the usual manner. If this happens, a resetting input will be applied to the counter 38 over wire 164, and this has the effect of removing the positive bias from the shield grid of the lock-on gate 40. Also, further counting pulses can then be applied to the counter 38 since tube 149 of the gated counter driver 37 will then again be conditioned to respond by reason of its higher suppressor grid voltage.

The positive-going trigger pulse appearing on wire 166 and effective to initiate a new saw-tooth wave from the local saw-tooth oscillator 25 is also applied through coupling capacitor 167 and resistor 168 to the plate of diode 169. The plate of this diode is normally biased to a negative voltage by action of the voltage dividing resistors 170 and 171 connected between (B—) and ground. The cathode of diode 169 is connected through resistor 172 to (B—) in order to provide a cut-off bias for the control grid of tube 173 of the constant width multivibrator 33. Therefore, the plate of diode 169 is connected to a negative source of voltage also through the effect of the voltage dividing resistors 170 and 171, to prevent the diode 169 from being normally conductive.

The two tubes 173 and 174 have their plate and grid circuits interconnected to provide a conventional multivibrator circuit. Tube 174 is normally conductive because its control grid is connected through resistor 175 to (B+). Its plate voltage is therefore relatively low and unable to overcome the negative grid bias effective on the grid of tube 173. However, when a positive-going trigger pulse appears on wire 166 the cut-off bias of tube 173 is momentarily overcome so that an abrupt reversal of the conductive states of the two tubes 173 and 174 occurs with tube 173 becoming conductive and tube 174 nonconductive. This reversal of states continues for an interval which is determined by the time constant for the discharging of capacitor 176. When this capacitor has discharged to a particular level, another abrupt reversal occurs so that tube 174 once more becomes conductive and tube 173 nonconductive. The effect, therefore, is that each occurrence of a positive-going trigger pulse on wire 166 produces a positive-going pulse at the plate of tube 174. The width of each multivibrator pulse is uniform and is unaffected by the width of the input pulse on wire 166.

The output amplifier tube 177 is biased to be nonconductive when the plate voltage of tube 174 is low since the grid of this tube is connected through resistor 178 to (B—). However, upon each positive-going pulse at the plate of tube 174, the triode tube 177 becomes conductive so that the normally high plate voltage of this tube is lowered. Each positive-going pulse at the plate of tube 174 therefore results in the appearance of a negative-going pulse at the plate of tube 177 as shown at line D of Fig. 3. These pulses are applied to the discriminator 34 which is distinctively affected according to the rate of occurrence of pulses to provide distinctive controls in accordance with vehicle speed.

Having described an improved speed measuring system as one specific embodiment of this invention, I wish it to be understood that various forms, modifications and alterations may be provided without departing in any manner from the spirit or scope of this invention.

What I claim is:

1. In a speed measuring system of the radio-frequency Doppler shift type, means for providing discrete electrical pulses whose frequency is proportional to the speed of a moving vehicle, circuit means for repeatedly providing a voltage proportional in amplitude to the time between successive of said pulses, means for storing said voltage, means for normally applying said voltage to said storage means only provided that its amplitude is within prescribed limits of the voltage already stored in said storage means, oscillatory means having its frequency governed by the amplitude of voltage stored in said storage means, and speed discriminating means governed by the frequency of operation of said oscillatory means for providing a distinctive output according to the speed of said vehicle.

2. In a system for measuring the speeds of vehicles, means for providing a beat frequency signal comprising pulses whose repetition rate is proportional to the speed of a moving vehicle, circuit means for repeatedly generating a voltage whose amplitude is proportional to the period of each successive pair of said pulses, storage circuit means for storing said voltage, voltage comparing circuit means governed by the comparative amplitudes of said generated voltage and the voltage then stored in said storage circuit means to permit said generated voltage to be stored in said storage circuit means only when its amplitude lies within prescribed limits of said voltage then stored in said storage circuit means, circuit means for at times rendering said voltage circuit means ineffective to thereby permit said generated voltage to be stored in said storage circuit means regardless of its amplitude in comparison with the voltage then stored in said storage circuit means, circuit means for generating electrical pulses whose frequency is proportional to the voltage then stored in said storage circuit means, and means responsive to the frequency of said generated electrical pulses for providing distinctive outputs indicative of the speed of said vehicle, whereby temporarily erratic conditions effecting said beat frequency signal do not affect said distinctive outputs indicative of the speed of said vehicle.

3. In a speed measuring system of the continuous wave radar type, circuit means for providing a signal of electrical pulses whose frequency is proportional to the speed of a moving vehicle, means for repeatedly providing a variable quantity whose amplitude is proportional to the interval between each successive pair of said pulses, storage means for storing said quantity, comparing means acting normally to permit said variable quantity to be stored in said storage means only if said quantity is within prescribed limits of the quantity already stored therein, means for rendering said comparing means inactive if the peak amplitude of said quantity does not fall within said prescribed limits for a predetermined number of times thereby permitting said quantity to be stored in said storage circuit regardless of its amplitude in comparison with the amplitude of the quantity then being stored in said storage means, oscillatory means having its frequency of operation governed by the amplitude of the quantity stored in said storage means, and speed discriminating means governed by the frequency of operation of said oscillatory means for providing a distinctive output indicative of the speed of said vehicle, whereby said distinctive output is not affected by temporarily erratic conditions of said signal.

4. In a speed measuring system of the continuous wave radar type, circuit means for providing a signal of electrical pulses whose frequency is proportional to the speed of a moving vehicle, means for repeatedly providing a voltage proportional in amplitude to the interval between each successive pair of said pulses, storage circuit means including a storage capacitor for storing said voltage, voltage comparison circuit means acting normally to permit said voltage to be stored in said storage means only if said voltage is within prescribed limits above or below the voltage then being stored therein, oscillatory circuit means having its frequency of operation governed by the amplitude of voltage stored in said storage circuit means, counting circuit means receiving an input count for each cycle of operation of said oscillatory circuit means, resetting means for said counter being made effective each time said voltage comparison circuit means acts to permit said voltage to be stored in said storage circuit means to thereby restore said counter to its zero count state, means for rendering said voltage comparison circuit means ineffective to prevent said voltage from being stored in said storage circuit means only when said counter has reached a predetermined count, circuit means rendering said counter ineffective to respond to further input counts while registering said predetermined count, and speed discriminating means governed by the frequency of operation of said oscillatory means for providing a distinctive output indicative of the speed of said vehicle, whereby said distinctive output is not affected by temporarily erratic conditions of said signal.

5. In a speed measuring system of the radio-frequency Doppler shift type, means for providing a signal of discrete electrical pulses whose frequency is proportional to the speed of a moving vehicle, circuit means including a sawtooth oscillator being controlled by each of said electrical pulses to provide a distinct sawtooth voltage wave, storage circuit means, means for selectively applying to said storage circuit means the peak voltage of each sawtooth voltage wave, voltage comparing circuit means acting normally to permit said peak voltage to be stored in said storage circuit means only if said peak voltage is within predetermined limits of the voltage then stored in said storage circuit means, means for rendering said voltage comparing circuit means inactive if the peak amplitude of said sawtooth voltage rate does not fall within said predetermined limits for a prescribed consecutive number of times to thereby permit said peak amplitude of said sawtooth wave to be stored in said storage circuit means regardless of its amplitude in comparison with the voltage then being stored in said storage circuit means, oscillatory means having its frequency of operation governed by the amplitude of voltage stored in said storage circuit means, and speed discriminating means governed by the frequency of operation of said oscillatory means for providing a distinctive output indicative of the speed of said vehicle.

6. In a speed measuring system of the radio-frequency Doppler shift type, means for providing a signal of discrete electrical pulses whose frequency is proportional to the speed of a moving vehicle, circuit means including a saw-tooth oscillator being controlled by each of said electrical pulses to provide a distinct saw-tooth voltage wave, storage circuit means, gating circuit means including a flip-flop circuit organization selectively operable to either of two distinctive states, said flip-flop circuit organization being operated to a normal distinctive state in response to each of said electrical pulses, voltage comparing circuit means being governed by the amplitude of said saw-tooth wave and by the amplitude of voltage then stored in said storage circuit to operate said flip-flop circuit organization to an abnormal opposite condition when said amplitude exceeds a predetermined value below the voltage then stored and to operate said flip-flop circuit organization back to its normal state when said amplitude exceeds a predetermined value above said voltage then stored in said storage circuit, a normal gate being rendered effective in response to each input pulse only when said flip-flop circuit organization is in its abnormal state to permit the then existing amplitude of said saw-tooth voltage wave to be stored in said storage circuit, oscillatory circuit means having its frequency of operation governed by the amplitude of voltage stored in said storage circuit means, counting circuit means receiving an input count from said oscillatory circuit means for each cycle of operation of said oscillatory circuit means, said counting circuit means being reset to its zero condition each time said normal gate responds to an input pulse, lock-on gating circuit means being rendered effective by an input pulse provided only that said counting circuit means has counted a predetermined number of input counts to permit the then existing amplitude of said saw-tooth voltage waves to be stored in said storage circuit means, and speed discriminating means governed by the frequency of operation of said oscillatory circuit means for providing a distinctive output indicative of the speed of said vehicle.

No references cited.